W. R. WEBSTER.
FILLER TUBE CAP.
APPLICATION FILED FEB. 6, 1913.

1,125,229.

Patented Jan. 19, 1915.

WITNESSES:
S. J. Berard
Mary E. Fuller

INVENTOR:
William R. Webster
BY Beach & Fisher
ATTORNEYS.

UNITED STATES PATENT OFFICE.

WILLIAM R. WEBSTER, OF BRIDGEPORT, CONNECTICUT, ASSIGNOR TO BRIDGEPORT BRASS COMPANY, OF BRIDGEPORT, CONNECTICUT, A CORPORATION OF CONNECTICUT.

FILLER-TUBE CAP.

1,125,229.  Specification of Letters Patent.  Patented Jan. 19, 1915.

Application filed February 6, 1913. Serial No. 746,565.

*To all whom it may concern:*

Be it known that I, WILLIAM R. WEBSTER, a citizen of the United States, residing in Bridgeport, county of Fairfield, and State of Connecticut, have invented certain new and useful Improvements in Filler-Tube Caps, of which the following is a full, clear, and exact description.

This invention relates to caps for filler tubes, and the improved cap herein set forth is particularly intended for use with filler tubes for automobile radiators, although it may be used advantageously in other applications.

The invention has among its objects to provide a light sheet metal cap which may be cheaply manufactured. In making the cap I use a minimum amount of stock and yet the construction is such that a particularly effective grip on the cap may be had by the operator when the cap is screwed into or out of its seat in the filler tube.

To these and other ends, the invention consists in the novel features to be hereinafter described and claimed.

Figure 2:
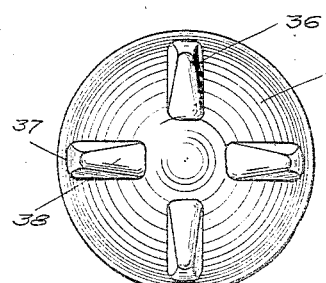
Figure 1:
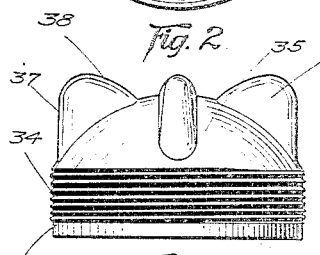
Figure 3:
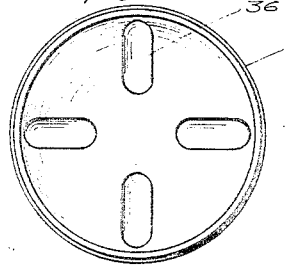
Figure 7:
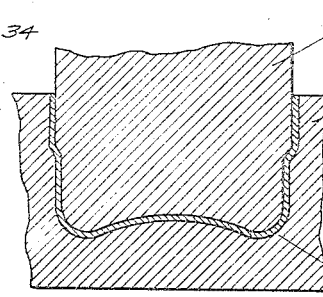

In the accompanying drawing, Figure 1 is a side elevation of a filler tube cap embodying my invention, Fig. 2 is a top plan view of the same, Fig. 3 is a bottom plan view of the cap, and Figs. 4 to 12 inclusive, show various stages in the process of manufacture.

The construction of the finished cap will be most clearly understood from a description of the method by which it is made.

Figure 4:
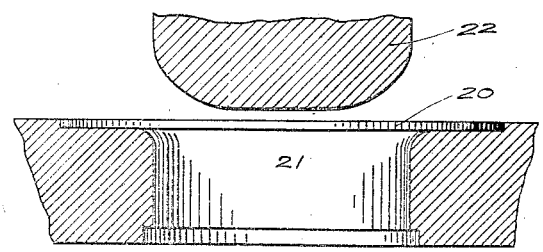
Figure 5:
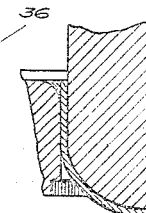
Figure 6:
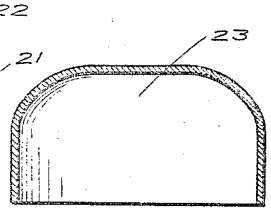

Referring particularly to Fig. 4, I take a disk 20 of brass or other suitable sheet metal and place it in a die 21. The disk 20 is then pushed through the die 21 by a punch or plunger 22 of appropriate form, as shown in Fig. 5, in order to form the disk into a cup 23, as shown in Fig. 6. The cup 23 is then placed in a female die 24 (Fig. 7) the cavity of which is generally cup shaped but is provided at the bottom with radial cutaway portions 25. A punch or male die 26 conforming to the shape of the die 24 is brought down into the cup 23 to form it between the die and punch, and the blank is given the shape shown in Fig. 8. The closed end of the cup is dome shaped as before but it is provided with a number of radially directed bosses 27. The curves of these bosses must necessarily be quite gentle in order to avoid breakage of the comparatively thin metal.

Figure 8:
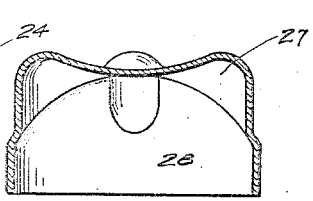
Figure 11:
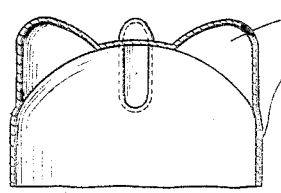
Figure 9:
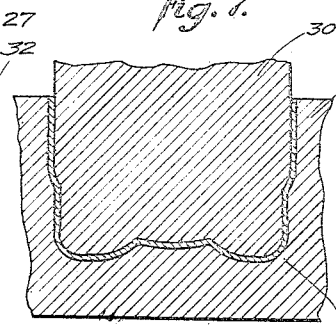
Figure 10:
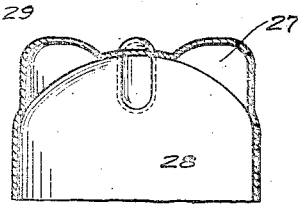
Figure 12:
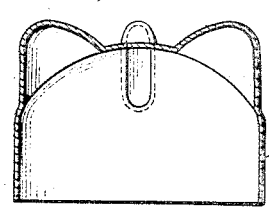

After the forming operation just described, the blank 28 shown in Fig. 8 is subjected to another forming operation of a similar character between a female die 29 and a punch or male die 30. The die 29 is similar to the die 25 except that the cutaway portions 31 in the bottom thereof are more sharply defined than the portions 25 and of course, the radial projections of the punch or male die 30 are correspondingly formed. The result of this operation is shown in Fig. 10, from which it will be noted that the bosses are made sharper and more acute. Their side walls are squeezed closer together to form radial wings and the angle between the side wall of the wing and the dome shaped outer surface of the main portion of the cap is more clearly defined. Moreover, the upper edges of the wings are brought higher above the top of the cap proper in spite of the fact that the wings are formed on the downwardly sloping surface of the cap rather than on the summit thereof. The blank is then stamped to bring it into the form shown in Fig. 11, wherein the wings are still further accentuated. The side walls of each wing are brought closer together and the upper tips of the wings are narrowed and sharpened. The cylindrical side wall 32 of the blank is then drawn down to a certain extent, as shown in Fig. 12, in order to straighten and true the same. The outer surface of this side wall is then provided in a well known manner with exterior screw threads, and after washing, buffing and lacquering the cap will be complete.

As shown in Figs. 1, 2 and 3, the finished cap is provided with a cylindrical side wall 33 having exterior screw threads 34 and the top of the cap is dome shaped, as indicated at 35, and provided with the upwardly directed wings 36. These wings may be worked out of the cap to a considerable extent, as shown in Fig. 1, so as to project substantially above the top of the dome, and yet in spite of the thinness of the metal the operations are such as to prevent any puncturing of the wings. The side walls of the wings are sharply defined and project upward to such an extent as to afford a very effective grip. The outer edges or walls 37 of the wings 36 are preferably directed vertically, and the top edges or walls 38 are preferably inclined downward toward the smooth or plain summit of the dome. I prefer to terminate the wings 36 short of the center of the cap so as to leave the summit of the dome of substantially the original thickness. In this manner the strength of the device is not appreciably impaired in view of the fact that solid portions of the thicker metal extend completely around each of the wings.

As constructed, the wings have been found to afford a very satisfactory grip for the fingers of the operator in screwing the cap into the filler tube or unscrewing therefrom. Moreover, the construction described reduces the weight of the cap to a minimum, and as the wings may be punched up from a comparatively thin disklike blank, the article may be very cheaply and economically produced.

Breakage or undue stretching of the metal in the several shaping operations may be prevented by annealing the blank in a well known manner. I prefer to anneal and pickle the blank prior to forming operations shown in Figs. 7 and 9 respectively, and prior to the stamping operation which accentuates the form of the wings and gives them the shape shown in Fig. 11. These and other features of my invention are susceptible of modification, however, within the scope of the appended claims.

What I claim is:

1. A cap such as described, comprising a sheet metal body formed like an inverted cup and having a dome shaped top with radial hollow gripping wings on the side of the dome; substantially as described.

2. A filler tube cap comprising a cup shaped sheet metal body having a dome shaped top, and upwardly projecting hollow integral gripping wings on the side of the dome portion extending above the summit of the cap; substantially as described.

3. A filler tube cap comprising a sheet metal body having a cylindrical side wall and a dome shaped top, and radial hollow wings struck up from the downwardly slanting portion of the dome remote from the center thereof; substantially as described.

4. As an article of manufacture, a filler tube cap comprising a cylindrical side wall, a dome shaped top, and hollow wings struck up from the downwardly slanting portion of the dome remote from the center thereof and having substantially upright outer walls or edges adjacent the periphery of the cap, and upper edges or walls inclined downwardly toward the summit of the dome; substantially as described.

In witness whereof, I have hereunto set my hand on the 31st day of January, 1913.

WILLIAM R. WEBSTER.

Witnesses:
C. E. HUTCHINSON,
O. H. PETERSON.